United States Patent

[11] 3,572,571

[72] Inventors Kenichi Mori;
Mitsuo Iwata, Yokohama, Japan
[21] Appl. No. 858,769
[22] Filed Sept. 17, 1969
[45] Patented Mar. 30, 1971
[73] Assignee Victor Company of Japan, Limited
Yokohama, Japan
[32] Priority Sept. 20, 1968, Apr. 26, 1969
[33] Japan
[31] 43/67664 and 44/37752

[54] PINCH ROLLER DEVICE FOR MAGNETIC RECORDING AND REPRODUCING APPARATUS
9 Claims, 10 Drawing Figs.

[52] U.S. Cl. .......... 226/176
[51] Int. Cl. .......... B65h 17/22
[50] Field of Search .......... 226/176, 177, 178, 186, 187

[56] References Cited

UNITED STATES PATENTS

| | | | |
|---|---|---|---|
| 3,148,819 | 9/1964 | Frick et al. | 226/176 |
| 3,233,806 | 2/1966 | Shirai | 226/178 |
| 3,269,625 | 8/1966 | Nieland et al. | 216/90 |

*Primary Examiner*—Allen N. Knowles
*Attorney*—Holman, Glascock, Downing and Seebold

ABSTRACT: In a magnetic recording and reproducing apparatus, a pinch roller device which moves a pinch roller downwardly lower than a determined height of a travelling path of a magnetic tape simultaneously as the pinch roller is disengaged and separated from a capstan.

Patented March 30, 1971 3,572,571

3 Sheets-Sheet 1

INVENTORS
KENICHI MORI
MITSUO IWATA
BY Holman, Glascock, Downing & Seebold
ATTORNEYS Fig. 4
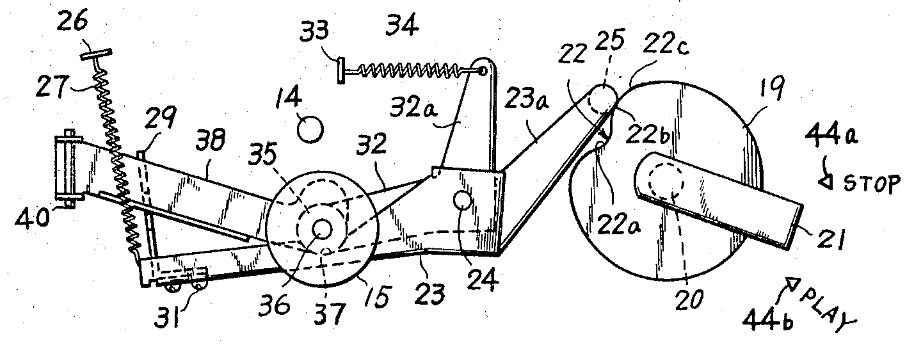
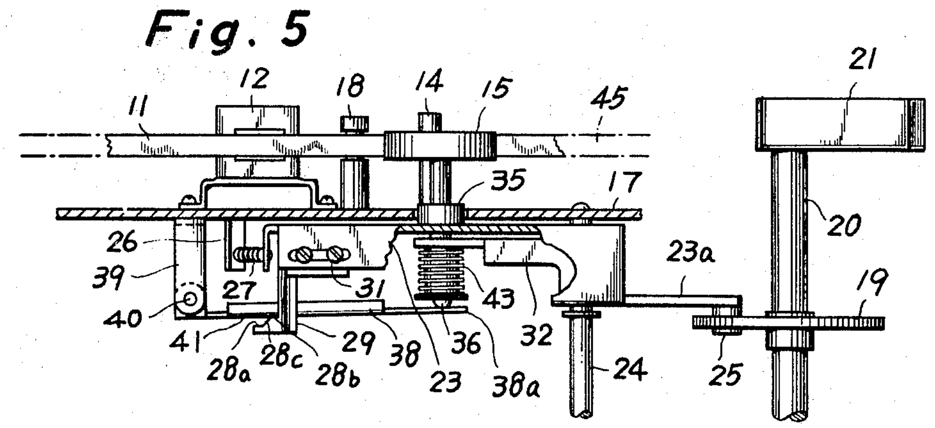
Fig. 6
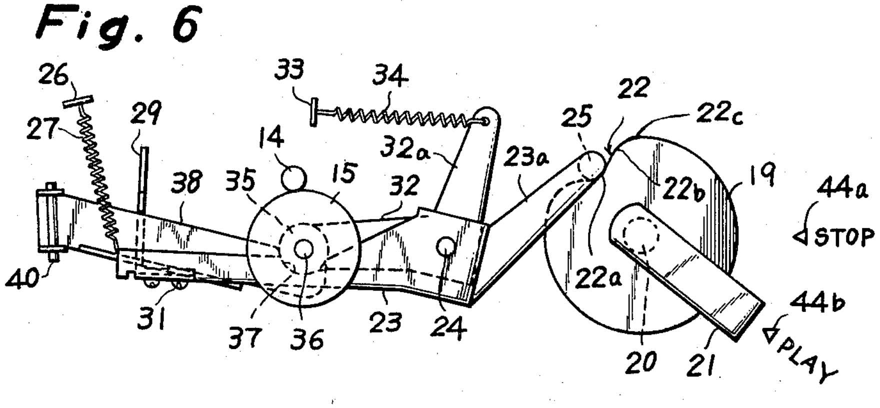
INVENTORS
KENICHI MORI
MITSUO IWATA
BY Holman, Glascock, Downing & Seebold
ATTORNEYS INVENTOR.
KENICHI MORI
MITSUO IWATA
BY Holman, Glascock, Downing & Seebold

ATTORNEYS

PINCH ROLLER DEVICE FOR MAGNETIC RECORDING AND REPRODUCING APPARATUS

The present invention relates to a pinch roller device for a magnetic recording and reproducing apparatus and more particularly to a pinch roller device for making an upward or downward movement simultaneously with a movement of engagement with or disengagement from a capstan in a magnetic recording and reproducing apparatus.

Generally, in a magnetic recording and reproducing apparatus, when a magnetic tape is loaded in or unloaded from the apparatus the pinch roller is disengaged and separated from a capstan driving the tape to run in cooperation with the pinch roller. At the time of nonoperation of the apparatus the pinch roller is disengaged from the capstan in order to prevent the pinch roller from deformation due to contact in compression against the capstan.

Conventional devices or mechanisms for engaging or disengaging the pinch roller with or from the capstan were constructed such that the pinch roller may be simply displaced in a horizontal plane for its engagement or disengagement relative to the capstan. It has been common for such conventional devices to have the pinch roller maintained at the same height as it is compressed against the capstan also during the disengagement from the capstan. For passing the magnetic tape aside a capstan and setting it between a supply reel and a takeup reel, however, the pinch roller often became an obstacle for the loading of a magnetic tape and subsequently the threading and loading operation of a magnetic tape on a magnetic head and further between the capstan and the pinch roller was extremely troublesome.

The disadvantage of the conventional device was completely eliminated by the present invention which has overcome the drawback by providing the construction so designed that said pinch roller may be lowered in height as desired when the pinch roller is disengaged and separated from the capstan.

A primary object of the present invention is therefore to provide a pinch roller device which can perform upward and downward movements of a pinch roller desirably to facilitate the loading or unloading of a magnetic tape to or from the magnetic recording and reproducing apparatus.

Other object of the present invention is to provide a pinch roller device for the magnetic recording and reproducing apparatus which has a simple construction and by which engagement or disengagement of the pinch roller with and from a capstan and upward and downward movements of the pinch roller as well can be made most securely.

Other object of the present invention is to provide a pinch roller device having a construction adapted to apply a magnetic tape from a side direction of a capstan without putting it in from above or taking it out of an interspace between the capstan and the pinch roller upon loading or unloading of the magnetic tape in the magnetic recording and reproducing apparatus.

Still other object of the present invention is to provide a pinch roller device having on a head plate an upward and downward movement mechanism of a pinch roller which will not anyway obstruct the operation of driving parts under the head plate of the magnetic recording and reproducing apparatus.

Other objects and advantages of the present invention will be apparent from the following description made in detail with reference to the accompanying drawings, in which:

FIGS. 4 and 5 are respectively plan and side views of the pinch roller device of the embodiment in which the pinch roller is in the course of engaging movement toward the capstan;

FIG. 6 is a plan view of the pinch roller device after it has accomplished the compression against the capstan;

Figure 1:
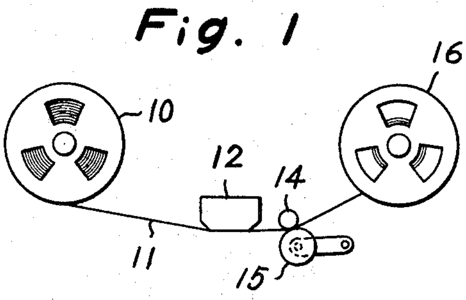
FIG. 1 is a diagrammatic plan view of an embodiment of a magnetic tape recording and reproducing apparatus which can be applied a pinch roller device according to the present invention.

Referring now to the drawing, FIG. 1 is a diagrammatic plan view of an embodiment of the magnetic tape recording and reproducing apparatus in which the device of the present invention can be employed. A magnetic tape 11 unwound from a supply reel 10 runs in contacting with a magnetic head block 13 and is driven by a capstan 14 and a pinch roller 15 for winding on a takeup reel 16. For loading the tape 11 between the supply reel 10 and the takeup reel 16 along a travelling path of the tape or unloading it therefrom, it has been conventional to displace the pinch roller 15 from the capstan 14 horizontally in the same plane but the operation has had the above mentioned disadvantage. The present invention is intended to provide a construction so designed that the pinch roller 15 is moved downwardly simultaneously as it is disengaged from the capstan 14 and reversely the pinch roller 15 is moved upwardly simultaneously as it is engaged with the capstan 14.

EMBODIMENT ILLUSTRATED IN FIGS. 2 TO 6

Throughout the FIGS. same numerals denote the same elements or members. On a head plate 17 with the magnetic head block 12 is provided with a guide stud 18 for regulating the height of the magnetic tape 11. The capstan 14 which is rotatable by a capstan motor (not shown) is provided upright on the head plate 17 therethrough. In FIGS. 4 and 6 the head plate 17 has been removed. A cam 19 is rotated by means of an operational knob 21 about a shaft 20. On the outer periphery of said cam 19 are provided a notch 22 consisting of a bottom portion 22*a*, an inclined portion 22*b* and a top portion 22*c*.

There is a push arm 23 which is provided horizontally revolvably on a shaft 24 under the plate 17, an end 23*a* of said arm having a pin 25 contacting with the peripheral surface of the notch 22 of the cam 19 and the other end 23*b* being provided a spring 27 suspended in tension between a projection 26 on the under surface of the plate 17. The arm 23 has on its end 23*b* a cam arm 29 secured to an elongated groove 30 with a screw 31. The cam arm 29 is formed of stepped portions 28*a*, 28*b* and an inclined surface portion 28*c*. The position of the cam arm 29 may be regulated by adjusting the fastening position of the screw 31 adequately with respect to the groove 30.

A horizontally revolvable arm 32 is provided so as to horizontally rotate on the shaft 24. At an end 32*a* of said arm is provided a spring 34 suspended in tension between a projection 33 on the under surface of the place 17 and at the other end 32*b* of the arm is provided a bearing 35. The bearing 35 supports a pinch roller shaft 36 to move slidingly upwardly and downwardly permitting the pinch roller 15 of free rotation at its upper end. The push arm 23 has a recess 37 adapted to push on the bearing 35 for movement. Tension of the spring 34 imparting a rotational force to the revolvable arm 32 in a counterclockwise direction is determined to be weaker than the tension force of the spring 27 imparting a rotational force to the push arm 23 in the clockwise direction.

A vertically revolvable arm 38 is provided on a bracket 39 on the under surface of the plate 17 to revolve upwardly and downwardly by a shaft 40. The arm 38 has a contact portion 41 to abut the cam surface of the cam arm 29 and the upper surface of its revolvable free end 38*a* bears against the lower end of the pinch roller shaft 36. The shaft 36 is always applied a force of contacting with the free end 38*a* of the arm 38 by a spring 43 tensioned between a ring 42 at the lower end of the shaft 36 and the under surface of the other end 32*b* of the arm 32.

Operations of the pinch roller device of the above described construction will now be explained.

Figure 2:
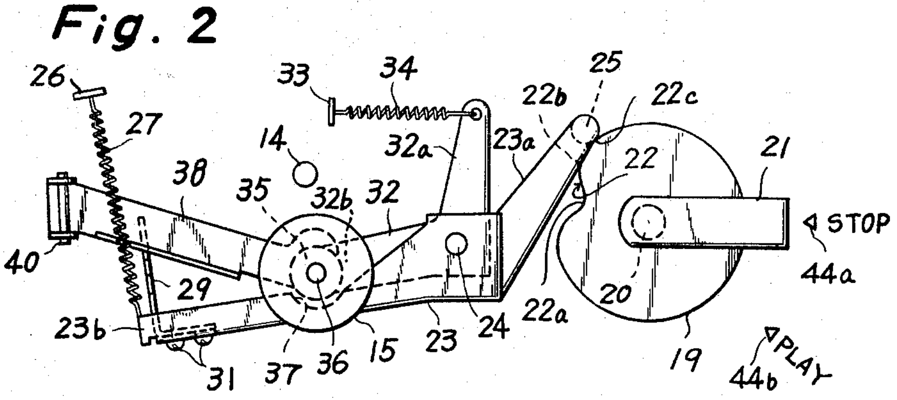
FIGS. 2 and 3 are respectively plan and side views of an embodiment of a pinch roller device according to the present invention in which a pinch roller is in a state of being entirely engaged and separated from a capstan.
Figure 3:
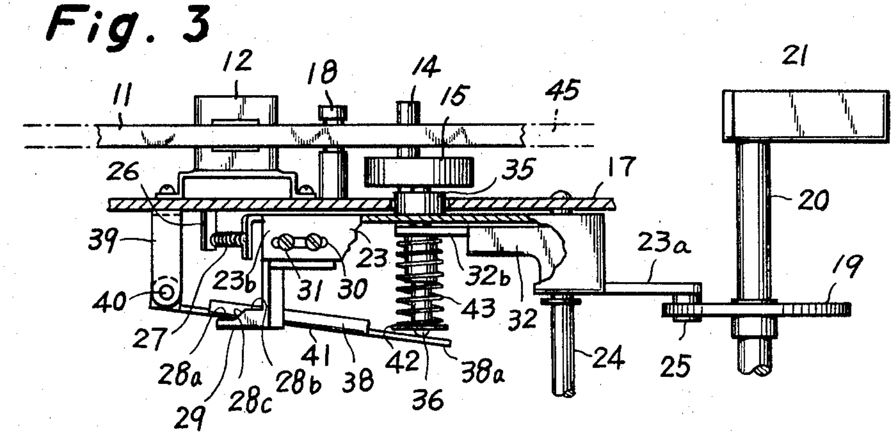
Figures 7, 8, 9, 10:
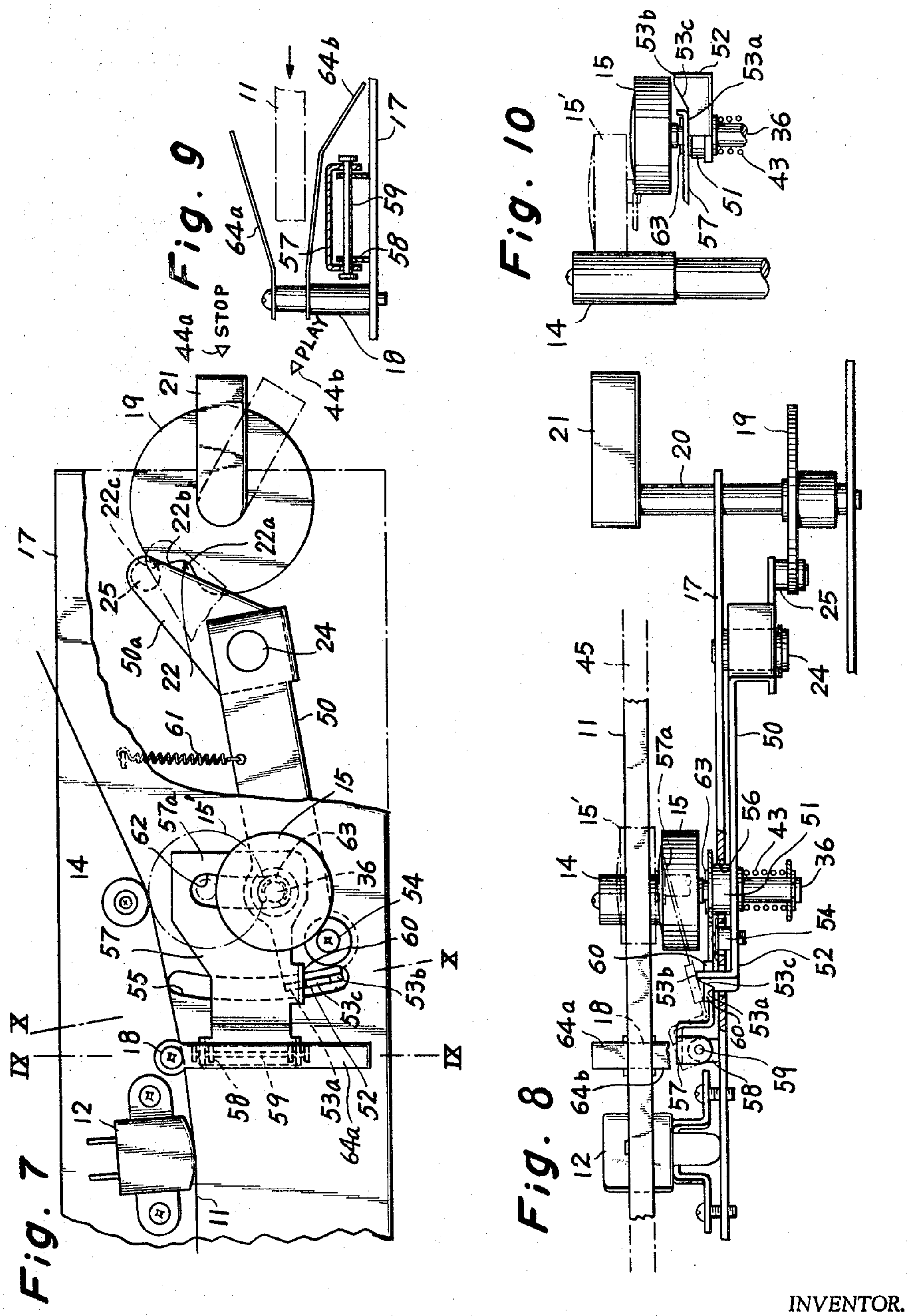
FIGS. 7 and 8 are respectively plan and side views of other embodiment of the pinch roller device according to the present invention.
FIG. 9 is a vertical side view in section taken along the line IX–IX of FIG. 7.
FIG. 10 is a vertical side view in section taken along the line X–X of FIG. 7.

During nonoperation of the magnetic recording and reproducing apparatus all components and members of the pinch roller device are in positions as shown in FIGS. 2 and 3, in which the operational knob 21 is, as shown in FIG. 2, in a position corresponding to a nonoperation indication part 44*a* on the plate 17, the cam 19 being in the position as illustrated, and the pin 25 contacts the top portion 22*c* on the peripheral surface of the cam 19. The arm 23 receiving a rotational force in the clockwise direction by spring 27 is restricted of its rotation by the contact of the pin 25 to the top portion 22*c* and is in a position as shown in FIG. 2, in which the recess 37 is apart from the bearing 35. Also the revolvable arm 32 is extremely moved in position in the counterclockwise direction by the spring 34 as shown in the same drawing, thus the pinch roller 15 being disengaged from the capstan 14.

In this position, the lower step 28*a* of the cam surface provided on the cam arm 29 abuts the contact portion 41 of the arm 38. Accordingly, the arm 38 is revolved to the lowest position. The pinch roller shaft 36 is pushed downward by the spring 43 to the lower position and the pinch roller 15 comes to a lower position below the height of a normal travelling path 45 of the tape 11 as shown in FIG. 3. Therefore, by this operation the tape 11 may well be loaded simply by putting the tape 11 up to the capstan 14 from a side direction and it will not anyway be obstructed by the pinch roller 15 for its loading. This applies the case of taking out the tape 11.

Upon compression of the pinch roller 15 to the capstan 14 the operational knob 21 is turned from a nonoperation indication part 44*a* to a playing operation indication part 44*b*. As shown in FIG. 4, the pin 25 during the course of turning of the knob 21 as described contacts with the inclined portion 22*b* and the arm 23 is revolved clockwise from the position as shown in FIG. 2. Then the recess 37 slightly contacts with the bearing 35. By revolution of the arm 23 the cam arm 29 revolves in the clockwise direction and as shown in FIG. 5 the contact portion 41 of the revolvable arm 38 contacts with the inclined surface portion 28*c* from the lower step 28*a* of the cam arm 29 and then next contacts with the upper step 28*b*. At this time the arm 38 is revolved upwardly by the inclined surface portion 28*c* and the revolvable free end 38*a* urges the pinch roller shaft 36 upwardly against the force of the spring 43. When the upper step 28*b* of the cam arm 29 comes into contact with the contact portion 41 the shaft 36 is in an uppermost position, the pinch roller 15 being moved upwardly in disengagement from the capstan 14 and being at a height equal to the position in a predetermined height of the normal travelling path 45 of the tape 11.

When the operational knob 21 is further turned from the position of FIG. 4 to the position corresponding to the playing operation indication part 44*b* as shown in FIG. 6 the pin 25 contacts with the bottom portion 22*a* of the recess 22, whereupon the push arm 23 revolves further in the clockwise direction from the position of FIG. 4 by the tension of the spring 27 and with the revolution of the arm 23 the recess 37 pushes the bearing 35 and revolves the arm 32 clockwise against the tension of the spring 34. By revolution of the arm 32 the pinch roller 15 revolves clockwise with the arm 32 maintaining the height same as the determined height of the travelling path of the tape and presses the contact with the capstan 14. The tape 11 is thus driven to run pinched between the capstan 14 in rotation and the pinch roller 15 compressing thereto whereby the magnetic recording and reproducing apparatus attains an ordinary recording and reproducing state.

Disengagement of the pinch roller 15 from the capstan 14 may be performed in an inverse way to the above described operation. More particularly the lever 21 is turned in the reverse direction so that the pin 25 will come out of the bottom portion 22*a* of the cam 19 and the push arm 23 is revolved in the counterclockwise direction against the tension force of the spring 27. The bearing 35 is gradually released from a pushing and engaging force of the recess 37. With this movement the revolvable arm 32 revolves counterclockwise by tension force of the spring 34 and thereby the pinch roller 15 is disengaged and separated from the capstan 14. Further, as the cam 19 is revolved the push arm 23 is revolved counterclockwise and the recess 37 is detached from the bearing 35. By revolution of the arm 23 the revolvable arm 38 revolves downwardly along the cam surface of the cam arm 29 and again as shown in FIG. 3 the pinch roller 15 moves downwardly lower than the height of the travelling path 45 of the tape to be convenient for taking out and unloading the tape from the apparatus.

OTHER EMBODIMENT ILLUSTRATED IN FIGS. 7 TO 10

In the present embodiment the same numerals designate the elements and members corresponding to those of the embodiment in the FIGS. 2 to 6.

In the embodiment there is shown a horizontally revolvable arm 50 to rotate horizontally on the shaft 24, one end 50*a* of the arm having a pin 25 contacting with the peripheral surface of the notch 22 of the cam 19 and the other end 50*b* bearing the pinch roller shaft 36 movably upward and downward and having the pinch roller 15 being rotatable at the upper end through bushing 51 and always receiving the rotational force of the clockwise direction by a spring 61. The foremost portion of the other end 50*b* of the arm is bent in a L-shape forming a bent portion 52, the upper surface of the bent portion 52 is formed in a stepped cam surface consisting of a stepped portions 53*a*, 53*b* and an inclined surface portion 53*c*. A collar 54 is provided at the other end 50*b* of the arm and fits to an elongated groove 55 of an arcuate shape on the head plate 17, which regulates the interval between the plate 17 and the arm 50 and avoids the displacement in height of said stepped cam surface. The above mentioned bushing 51 fits to an arcuately elongated groove 56 provided on the plate 17.

A vertically revolvable arm 57 is provided on a bracket 58 on the upper surface of the head plate 17 and is revolvable upwardly and downwardly by shaft 59. The arm 57 has a contact portion 60 to abut the cam surface of the bent portion 52 of the arm 50. At the revolvable free end 57*a* of the arm 57 is formed an elongated groove 62 of an arcuate shape fitting to the upper portion of the pinch roller shaft 36. Said revolvable free end 57*a* contacts with the under surface of a stopper 63 closely provided to the under surface of the pinch roller 15 on the pinch roller shaft 36. On the guide stud 18 is secured tape guide plates 64*a* and 64*b* with a distance substantially equal to the width of the tape 11. The guide plates 64*a* and 64 *b* are opened at front ends having a distance increasingly larger between each other.

Operations of the pinch roller device having the above described construction will be explained below.

When the magnetic recording and reproducing apparatus is in a state of nonoperation all parts and members of the pinch roller device rest in positions as shown in full lines throughout the FIGS. In this condition the operational knob 21 lies in a position corresponding to the nonoperation indication part 44*a* and the pin 25 contacts with the top portion 22*c* on the peripheral surface of the cam 19. Receiving the rotational force in the clockwise direction by the spring 61 the arm 50 is restricted of its revolution by the pin 25 and the cam 19 so that the pinch roller 15 is disengaged from the capstan 14. In this position the lower step 53*a* of the bent portion 52 of the arm 50 abuts the contact portion 60 of the arm 57 and the arm 57 is in the lowermost position and thus the pinch roller 15 is moved to the lowermost position which is lower than the height of the normal travelling path of the tape 11. Accordingly, the tape 11 can be simply applied between the tape guide plates 64*a* and 64 *b* from a side direction and is moved along the plates 64*a* or 64*b* to reach the guide stud 18 and applied along the normal travelling path 45. On this occasion the tape 11 is not obstructed anyway by the pinch roller 15 which is moving downwardly but is applied to the capstan 14 in a proper way. The same operation applies the case of taking out of the tape 11.

In order to make a press-contacting of the pinch roller 15 to the capstan 14 the operational knob 21 may be turned from the nonoperation indication part 44a to the playing operation indication part 44b. By turning of the knob 21 the cam 19 is rotated and the pin 25 is contacted from the top portion 22c to the inclined portion 22b of the cam 19. With this movement, the arm 50 is pulled by the spring 61 to revolve clockwise and the inclined portion 53c of the bent portion 52 abuts the contact portion 60 of the arm 57 and the said arm is revolved upwardly. With the upward revolution of the arm 57 its revolvable free end 57a moves the pinch roller 15 upwardly through the stopper 63. When the upper step 53b of the bent portion 52 comes to abut the contact portion 60 the arm 57 revolves to the uppermost position and the position in height of the pinch roller 15 becomes equal to the position in height of the normal travelling path 45 of the tape 11. During this operation the arm 50 is revolved clockwise and the pinch roller 15 comes, when its position in height is as predetermined, to a position close to the capstan 14 in the horizontal plane.

As the cam 19 is turned by the knob 21 and the pin 25 reaches from the inclined portion 22b to the bottom portion 22a of the cam 19, the upper step 53b of the bent portion 52 contacts with the under surface of the contact portion 60 of the arm 57 and the revolvable arm 50 is further revolved slightly in the clockwise direction, therefore the pinch roller 15 also revolves slightly in the clockwise direction maintaining the same height as that of the travelling path of the tape as predetermined and press-contacts with the capstan 14 having the tape 11 therebetween.

The disengagement of the pinch roller 15 from the capstan 14 may be performed in the inverse way to the above described operation, where the pinch roller 15 may be disengaged from the capstan 14 and simultaneously moved downwardly so that the taking off and unloading the tape may be performed quite conveniently.

According to the present embodiment the revolvable arm 57 moving the pinch roller 15 upwardly and downwardly is provided above the head plate 17 so that it will not obstruct any other mechanisms provided under the head plate 17.

In both of the above described embodiments, the vertically revolvable arm is operated by the cam on the horizontally revolvable arm so that said horizontally revolvable arm moves the pinch roller upwardly and downwardly. Since the cam portion does not directly move the pinch roller shaft upwards and downwards, the pinch roller shaft is not affected by sideward pressure so that a smooth upward and downward movement is accomplished.

While the invention has been described with respect to the specific and preferable embodiments, various modifications and variations thereof will be apparent to those skilled in the art without departing from the scope of which is set forth in the appended claims.

We claim:

1. A pinch roller device for magnetic recording and reproducing apparatus which comprises a turnable cam means having a cam surface, horizontally revolvable arm means, one arm portion of said arm means contacting with a cam surface of said cam means and the other arm portion having a cam part with a cam surface, a pinch roller means engaging or disengaging with or from a capstan by revolving of said horizontally revolvable arm means, and a vertically revolvable arm means making an upward and downward revolution in contact with the cam part by revolving of said horizontally revolvable arm means and moving said pinch roller means upwardly and downwardly by its revolvable free end, said vertically revolvable arm means actuates to move said pinch roller means lower than a height of a predetermined travelling path of a magnetic tape during said pinch roller means is disengaged from said capstan.

2. A pinch roller device for magnetic recording and reproducing apparatus according to claim 1 wherein said pinch roller means includes a pinch roller and a second revolvable arm bearing a pinch roller shaft which is capable of upward and downward movement and is provided with said pinch roller revolvably, said horizontally revolvable arm means in a first revolvable arm which pushes and revolves said second revolvable arm, and said vertically revolvable arm means is constructed in such a manner that its revolvable free end contacts with the lower end of said pinch roller shaft allowing said shaft to move upwardly and downwardly.

3. A pinch roller device for magnetic recording and reproducing apparatus according to claim 2 wherein said first revolvable arm is apart from said second revolvable arm when said pinch roller is separated from said capstan and said vertically revolvable arm moves said pinch roller upwardly to a height equal to a height of a travelling path of a magnetic tape as predetermined by said cam part of said first revolvable arm while said first revolvable arm revolves to approximately contact with said second arm and by subsequent rotation of said first revolvable arm said pinch roller moves closely to the capstan and press-contacts with said capstan.

4. A pinch roller device for magnetic recording and reproducing apparatus according to claim 1 wherein said horizontally revolvable arm means and said vertically revolvable arm means are provided lower than a head plate through which the capstan is erected upright.

5. A pinch roller device for magnetic recording and reproducing apparatus according to claim 1 wherein said pinch roller means is provided in said horizontally revolvable arm means, said vertically revolvable arm means having its revolvable free end closely in contact to the under surface of said pinch roller, said free end moving the pinch roller upwardly and downwardly.

6. A pinch roller device for magnetic recording and reproducing apparatus according to claim 5 wherein said vertically revolvable arm is provided on the upper surface of the head plate through which the capstan is erected upright, and said pinch roller means protrudes through an elongated groove at a free end of said vertically revolvable arm.

7. A pinch roller device for magnetic recording and reproducing apparatus according to claim 6 wherein said horizontally revolvable arm means has a cam part protruding through said head plate and contacts with said vertically revolvable arm to revolve said arm upwardly and downwardly.

8. A pinch roller device for magnetic recording and reproducing apparatus according to claim 5 wherein the cam part of said horizontally revolvable arm moves said vertically revolvable arm to a lowermost position when said pinch roller means is mostly disengaged and separated from said capstan and said cam part by rotation of said horizontally revolvable arm revolves said vertically revolvable arm upwardly so that said pinch roller may be positioned in a height equal to a height of a travelling path of the magnetic tape as predetermined and simultaneously said horizontally revolvable arm actuates said pinch roller to press-contact with said capstan.

9. A pinch roller device for magnetic recording and reproducing apparatus according to claim 5 which includes a guide stud provided at an equal height as a magnetic head on a head plate and a pair of tape guide panel members, the ends of said members being secured to said guide stud at a distance equal to the width of the magnetic tape and the other ends increasingly separated from each other.

UNITED STATES PATENT OFFICE
CERTIFICATE OF CORRECTION

Patent No. 3,572,571 Dated March 30, 1971

Inventor(s) Kenichi Mori and Mitsuo Iwata

It is certified that error appears in the above-identified patent and that said Letters Patent are hereby corrected as shown below:

Column 1, line 65, before "which" insert -- to --;
lines 70-71, change "engaged" to -- disengage
Column 2, line 15, change "13" to -- 12 --;
line 33, after "FIGS." insert -- 2, --;
line 54, change "place" to -- plate --;
Column 4, line 24, after "52," insert -- and --.

Signed and sealed this 7th day of September 1971.

(SEAL)
Attest:

EDWARD M.FLETCHER,JR.
Attesting Officer

ROBERT GOTTSCHALK
Acting Commissioner of Pate